UNITED STATES PATENT OFFICE.

WILLIAM S. BREWSTER, OF CHICAGO, ILLINOIS.

IMPROVED PREPARATION OF WHEAT FOR FOOD.

Specification forming part of Letters Patent No. 104,700, dated June 28, 1870.

*To all whom it may concern:*

Be it known that I, WILLIAM S. BREWSTER, of Chicago, in the county of Cook and State of Illinois, have invented a new and useful Dietetic Compound; and I do hereby declare the following to be a full, clear, and exact description thereof, which will enable others skilled in the art to make and use the same.

My invention has for its object to prepare an article of food from wheat which shall retain intact those chemical properties of the grain which are absolutely essential for dietetic purposes.

The invention consists in mashing or jamming the wheat in such a manner that the hull shall remain with the flour for consumption.

The grain must be jammed or mashed in contradistinction to grinding or cracking, so that when they leave the rollers each grain is thoroughly mashed or pressed out of its original shape, yet the particles adhere closely to each other, and are not rubbed or abraded.

The preservation of a low temperature is absolutely essential to the success of my improved process, to prevent the escape of the phosphates contained in the grain, which would be the case if the temperature were raised.

I am aware that cracked wheat is a common product, designed for dietetic purposes; but the process must be performed between millstones, which not only heat the grain, but abrade and destroy the hull or covering to such an extent as to defeat the very object sought by the cracking process—viz., the retention of the phosphates contained in the hull or covering.

The retention of the phosphates is sought to be obtained in what is known as "Graham flour" by not bolting the wheat after grinding. This, however, is not the case.

The bran is preserved, it is true, but the phosphates are dispelled for the following reasons: To produce this flour it is necessary to grind the wheat by the ordinary process—that is to say, between millstones weighing from fifteen hundred to twenty-five hundred, and running with great velocity. The flour thus ground is thrown out heated to such an extent that the phosphates absorb the atmosphere while the flour is cooling, and are thereby dissipated or thrown off to such an extent that but little or no stimulating properties remain in the flour. It has been the subject of much study to prevent this, and various means have from time to time been devised to keep the flour cool, but thus far without success. It is necessary, therefore, that radical changes should be made in treating the wheat itself.

My invention departs, primarily, from all methods heretofore employed; and has for its object, first, to preserve that portion of the wheat which principally contains the phosphates—viz., the hull; and, secondly, to preserve the phosphates themselves.

To carry this into effect the hull of the grain must be retained and prevented from becoming heated, for the reasons previously mentioned. In passing the wheat between rollers, it is fed at a rate of speed corresponding to the rotation of the rollers, and therefore the kernels are mashed with two opposite sides, flattened and in contact, and the hull is not abraded or rubbed. If fed faster or slower than the speed of the rollers, the latter would rub and injure the hulls of the grain.

When the grain is ground, as in the preparation of cracked wheat or Graham flour, it will be readily understood that the hull is rubbed or scraped by the operation of the millstones, and consequently a large proportion is lost and destroyed, and also that it cannot be ground without becoming heated to such an extent as to dissipate the phosphates in such small portions of the hull as are preserved.

By my process all the inherent properties of the grain are retained, prominent among which are gluten and saccharine, so that bread and crackers can be made without fermentation or the addition of any foreign substance, excepting salt and water; consequently for dietetic purposes it is vastly superior to any product of wheat or other grain known to the trade.

If desired, a small proportion of fine flour may be added to the mashed wheat to render the bread more palatable; but this is not essential.

I do not claim crushing the wheat to be afterward ground into flour and the bran excluded; but,

Having thus described my invention, what I claim as new, and desire to secure by Letters Patent, is—

As an improved product for dietetic purposes, jammed or crushed wheat, in which the bran and flour are both retained for consumption, as herein described, for the purpose specified.

WILLIAM S. BREWSTER.

Witnesses:
G. H. FROST,
D. I. POWERS.